US012724878B2

(12) United States Patent
George et al.

(10) Patent No.: US 12,724,878 B2
(45) Date of Patent: Sep. 1, 2026

(54) GENERATING INSTRUMENTATION FOR DATA INTEGRITY OF FUNCTION CALLS

(71) Applicant: INTERNATIONAL BUSINESS MACHINES CORPORATION, Armonk, NY (US)

(72) Inventors: Rahul George, State College, PA (US); Frederico Araujo, Mahopac, NY (US); Teryl Paul Taylor, Colorado Springs, CO (US); Jiyong Jang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 18/531,341

(22) Filed: Dec. 6, 2023

(65) Prior Publication Data

US 2025/0190545 A1 Jun. 12, 2025

(51) Int. Cl.
*G06F 21/00* (2013.01)
*G06F 21/54* (2013.01)

(52) U.S. Cl.
CPC ........ *G06F 21/54* (2013.01); *G06F 2221/033* (2013.01)

(58) Field of Classification Search
CPC ........................... G06F 2221/033; G06F 21/54
USPC ........................................................... 726/22
See application file for complete search history.

(56) References Cited

U.S. PATENT DOCUMENTS 8,966,312 B1 * 2/2015 Gupta ................. G06F 11/1469 714/21
9,390,261 B2 7/2016 Costa
10,657,025 B2 5/2020 Iyer
11,010,495 B1 5/2021 Mcardle
11,163,645 B2 * 11/2021 Kashani ................ G06F 11/143
11,308,214 B2 4/2022 Anati
2006/0059496 A1 * 3/2006 Joy ..................... G06F 11/3636 719/310
2009/0271412 A1 * 10/2009 Lacapra ................ G06F 16/178
2015/0227746 A1 8/2015 Chen
(Continued)

FOREIGN PATENT DOCUMENTS

EP 4422128 A2 * 8/2024 ........... G06F 21/566

OTHER PUBLICATIONS

A.R. Rachala, "Evaluation of Hardware-Based Data Flow Integrity," Thesis by Abhijith Reddy Rachala, Master of Science, Aug. 2019, 51 pp.

(Continued)

*Primary Examiner* — Josnel Jeudy
(74) *Attorney, Agent, or Firm* — CHIP LAW GROUP

(57) ABSTRACT

Provided are a computer program product, system, and method for generating instrumentation for data integrity of function calls. Instrumentation is generated to determine whether argument values passed to functions have changed since written to memory locations during execution of the computer program. A reference monitor that runs during execution of the computer program compares an argument value, for a function, written to a memory location to an argument value passed to the function to determine whether the argument value has changed. The reference monitor permits execution of the function with the passed argument value in response to determining that the argument value has not changed.

19 Claims, 6 Drawing Sheets

(56) References Cited

U.S. PATENT DOCUMENTS

| | | | | |
|---|---|---|---|---|
| 2017/0153908 | A1* | 6/2017 | Han | G06F 21/53 |
| 2019/0222591 | A1* | 7/2019 | Kislitsin | G06F 9/45558 |

OTHER PUBLICATIONS

D. Brumely, et al, "Privtrans: Automatically Partitioning Programs for Privilege Separation", Proceedings of the 13th USENIX Security Symposium, San Diego, CA, USA Aug. 9-13, 2004, 16 pp.

K. Lu, et al., "Where Does It Go?: Refining Indirect-Call Targets with Multi-Layer Type Analysis," CCS '19: Proceedings of the 2019 ACM SIGSAC Conference on Computer and Communications Security, Nov. 2019pp. 1867-1881.

L. Szekeres, et al., "SoK: Eternal War in Memory," SP '13: Proceedings of the 2013 IEEE Symposium on Security and Privacy, May 2013, 15 pp.

Li et al., "Fine-cfi: fine-grained control-flow integrity for operating system kernels." IEEE Transactions on Information Forensics and Security 13.6 (2018): 1535-1550.

M. Castro, et al., "Securing software by enforcing data-flow integrity," USENIX, OSDI '06 Paper, pp. 147-160, [online][retrieved Nov. 19, 2023] https://www.usenix.org/legacy/event/osdi06/tech/full_papers/castro/cas . . . .

M. Ismail, et al., "VIP: Safeguard Valve Invariant Property for Thwarting Critical Memory Corruption Attacks," ACM, 2021, 15 pp.

S. Ghavamnia, et al., "Temporal System Call Specialization for Attack Surface Reduction," USENIX, Proceedings of the 29th USENIX Security Symposium, Aug. 12-14, 2020, 19 pp.

Szekeres et al, "Eternal War in Memory", IEEE Computer and Reliability Societies, May/Jun. 2014, pp. 9.

* cited by examiner

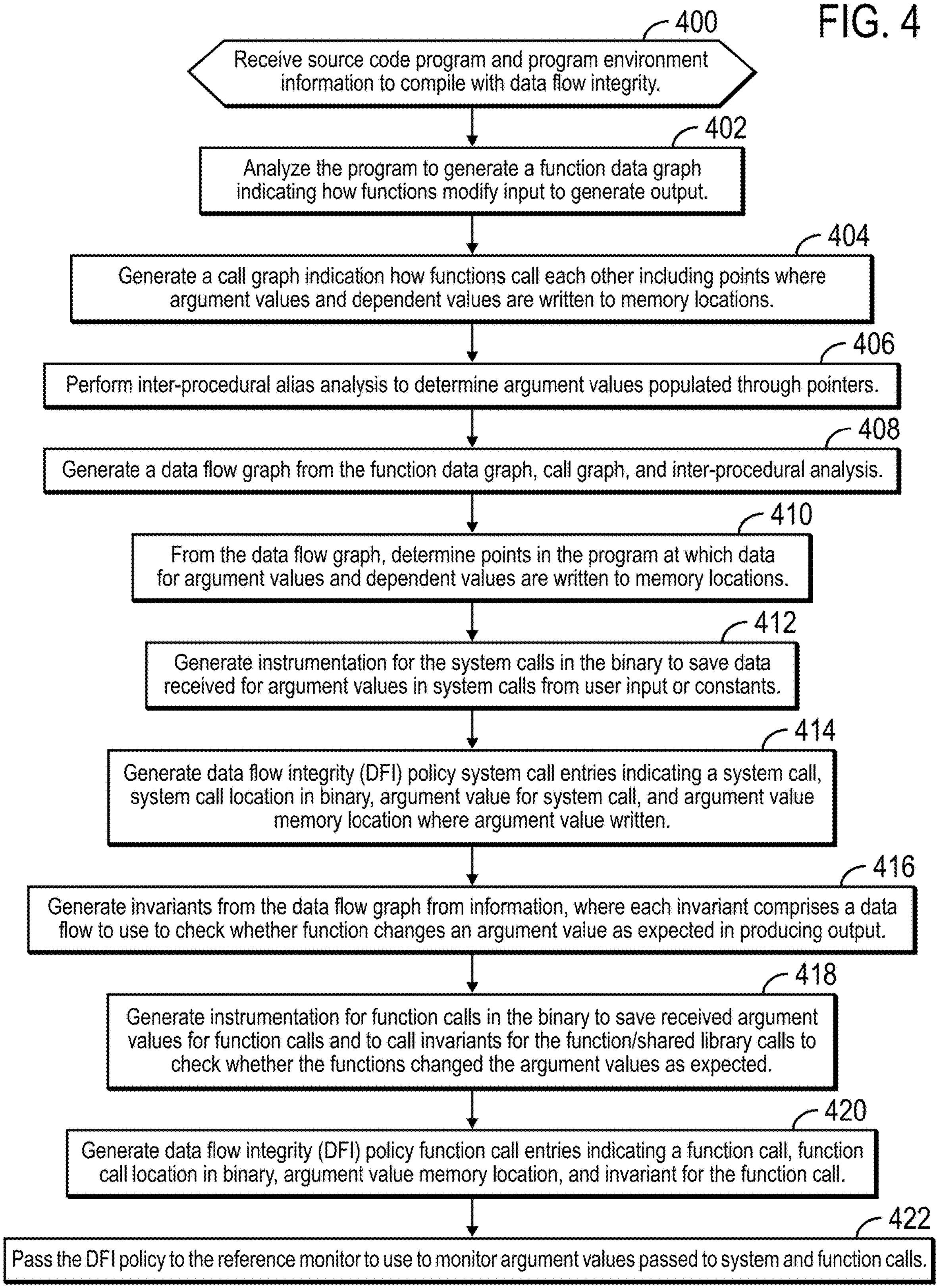

FIG. 4
400
Receive source code program and program environment information to compile with data flow integrity.
402
Analyze the program to generate a function data graph indicating how functions modify input to generate output.
404
Generate a call graph indication how functions call each other including points where argument values and dependent values are written to memory locations.
406
Perform inter-procedural alias analysis to determine argument values populated through pointers.
408
Generate a data flow graph from the function data graph, call graph, and inter-procedural analysis.
410
From the data flow graph, determine points in the program at which data for argument values and dependent values are written to memory locations.
412
Generate instrumentation for the system calls in the binary to save data received for argument values in system calls from user input or constants.
414
Generate data flow integrity (DFI) policy system call entries indicating a system call, system call location in binary, argument value for system call, and argument value memory location where argument value written.
416
Generate invariants from the data flow graph from information, where each invariant comprises a data flow to use to check whether function changes an argument value as expected in producing output.
418
Generate instrumentation for function calls in the binary to save received argument values for function calls and to call invariants for the function/shared library calls to check whether the functions changed the argument values as expected.
420
Generate data flow integrity (DFI) policy function call entries indicating a function call, function call location in binary, argument value memory location, and invariant for the function call.
422
Pass the DFI policy to the reference monitor to use to monitor argument values passed to system and function calls.

Computer 801

Processor Set 810

Processing Circuitry 820

Cache 821

Communication Fabric 811

Volatile Memory 812

Persistent Storage 813

Operating System 822

Compiler 104

Data Flow Analysis 200

845

Peripheral Device Set 814

UI Device Set 823

Storage 824

IoT Sensor Set 825

Network Module 815

End User Device 803

WAN 802

Remote Server 804

Remote Database 830

Private Cloud 806

Gateway 840

Public Cloud 805

Cloud Orchestration Module 841

Host Physical Machine Set 842

Virtual Machine Set 843

Container Set 844

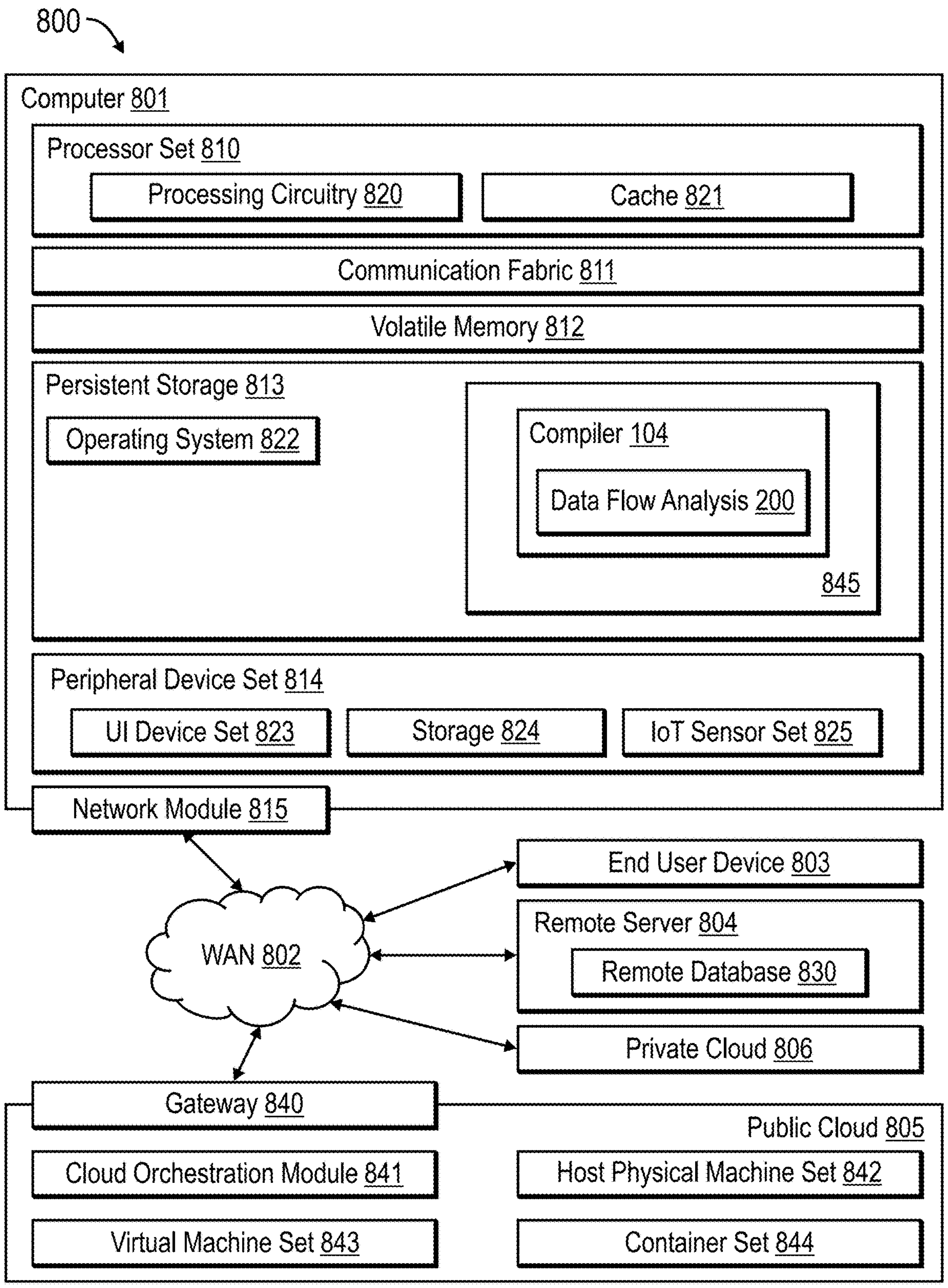

FIG. 8

GENERATING INSTRUMENTATION FOR DATA INTEGRITY OF FUNCTION CALLS

This invention was made with government support under government contract number W911NF-13-2-0045 awarded by the Army Research Office (ARO). The government has certain rights to this invention.

BACKGROUND OF THE INVENTION

1. Field of the Invention

The present invention relates to a computer program product, system, and method for generating instrumentation for data integrity of function calls.

2. Description of the Related Art

Malicious attacks may exploit the intended data flow of a program to write data to unintended memory locations. Control flow integrity techniques may ensure that a program's control flow follows a predefined legitimate order in a control flow graph. Any calls not within the legitimate flow confines of the control flow graph are blocked as potentially malicious calls. Data flow integrity techniques may determine a data flow graph of legitimate data flow operations, such as writes to memory locations, and restrict data flow to those written memory locations specified in the data flow graph.

Other data integrity techniques may protect just sensitive data in memory by annotating and partitioning data to control what operations can be performed with respect to selective data. Isolation techniques may seek to partition programs into potentially unsafe partitions and critical data partitions and limit how calls in the unsafe partition can be performed on data partitions.

SUMMARY

Provided are a computer program product, system, and method for generating instrumentation for data integrity of function calls. Instrumentation is generated to determine whether argument values passed to functions have changed since written to memory locations during execution of the computer program. A reference monitor that runs during execution of the computer program compares an argument value, for a function, written to a memory location to an argument value passed to the function to determine whether the argument value has changed. The reference monitor permits execution of the function with the passed argument value in response to determining that the argument value has not changed.

BRIEF DESCRIPTION OF THE DRAWINGS

FIG. 4 illustrates an embodiment of operations to compile a source code program to include instrumentation for data flow integrity.

FIG. 8 illustrates a computing environment in which the components of FIGS. 1 and 3 may be implemented.

DETAILED DESCRIPTION

Malicious attacks may exploit memory errors to corrupt the argument values used with system calls to perform malicious operations. The corrupted system call argument values may be used to interact with the operating system maliciously through network, file, and process operations. Techniques such as control flow integrity may not address this problem of corrupting argument values because the program's control flow remains legitimate as per the control flow graph, except that argument values are corrupted to cause malicious operations. Data flow integrity techniques may incur significant performance overhead on the program's execution time and require modifying libraries making it harder to employ in production systems.

Described embodiments provide improved techniques to detect/prevent attacks (bad behavior) that violate permitted data flow of sensitive data in an executable program and violate data flow contracts for external shared libraries (i.e., functions). Sensitive data comprises passwords, personal information, account numbers, and other information that needs to be protected from malicious attacks.

Described embodiments provide improvements to techniques for detecting malicious behavior by using a compiler to analyze source code and generate a data flow graph. The data flow graph is used to determine points in the program at which data may be written to the memory location for each system call argument, and points where prior data, collectively referred to as dependent values, may be written to a memory location corresponding to current data up until all such points are identified. The compiler may generate instrumentation to save argument values and dependent values at the points identified to compare with argument values used before executing a system call or call to an external function (library) to determine if the value has changed. The invariants/data flow contracts for calls to external functions would be used to check whether an external function changes the value as expected without executing the function. Detecting unexpected function changes may indicate that data integrity has been compromised and that malicious changes have been made to exploit the function calls.

Described embodiments may reduce overhead of data integrity checking of system calls by having the program save the argument values and dependent values for system calls, but have a separate monitor use the saved values along with the invariants to determine data integrity of the executing system calls and function calls in the program.

Figure 1:
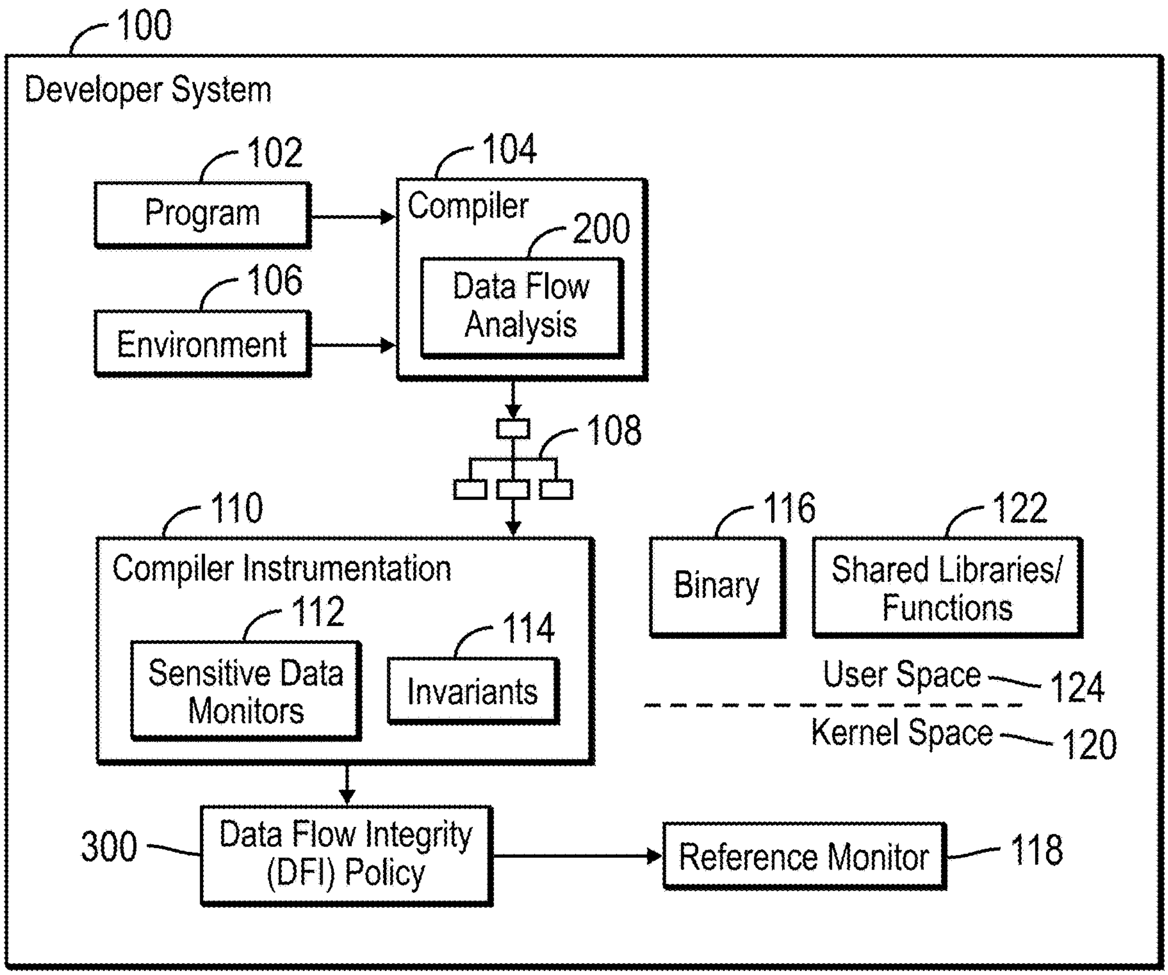
FIG. 1 illustrates an embodiment of a developer system to compile a program.

FIG. 1 illustrates an embodiment of a software developer system 100 a software developer uses to compile a program 102 comprising source code. A compiler 104 receives the program 102 and environment information 106, such as configuration information, environment, file system, etc. The compiler 104 includes a data flow analysis 200 program that generates a data flow graph 108 having information on all system call argument values, dependent values, and an order and flow of the system calls and function calls and data. The compiler 104 may generate an intermediate representation of the program 102. The compiler 104 may generate compiler instrumentation 110 including sensitive data monitors 112 to monitor system calls and function calls that affect sensitive data and invariants 114 generated from the data flow graph 108. An invariant/data flow contract 114, for a function/shared library call, models how the operations of the function modify the passed argument value and generate output from the argument value without analyzing the function. In one embodiment, an invariant may denote the expected access level (e.g., no access, read-only, read-write) of the operations of a function over the function's input arguments.

The compiler 104 may generate binary code 116, comprising machine dependent assembly language code for a target platform indicated in the environment information 106. The compiler 104 may embed the sensitive data monitors 112 in instrumentation code in the binary code 116 to save argument values and dependent values for system calls, to save received input for function calls/shared libraries, and to invoke invariants 114 to check whether the called function changes an argument value as expected. The compiler 104 may further generate a data flow integrity (DFI) policy 300 having information on argument values and dependent values for system and function calls to check for data integrity and detect malicious attacks. The DFI policy 300 is passed to a reference monitor 118 that runs in a kernel space 120 to monitor execution of the binary 116 code and shared libraries 122, also referred to as functions, that execute in a user space 124. The labeled user space 124 and kernel space 120, in FIG. 1, do not refer to the execution environment in the developer system 100, but instead illustrate how components for the compiled program 102 will execute when deployed, such as the binary 116 and shared libraries 122 executing in a user space 124 and the reference monitor 118 executing in the kernel space 120. System calls called from the binary 116 may be executed in the kernel space 120.

The compiler may comprise LLVM and other compiler frameworks. The compiler instrumentation 110 may comprise LLVM instrumentation that inserts probes into the compiled binary code 116 to allow the reference monitor 118 to monitor when sensitive data is provided for system calls and function calls from user input or constants.

Figure 2:
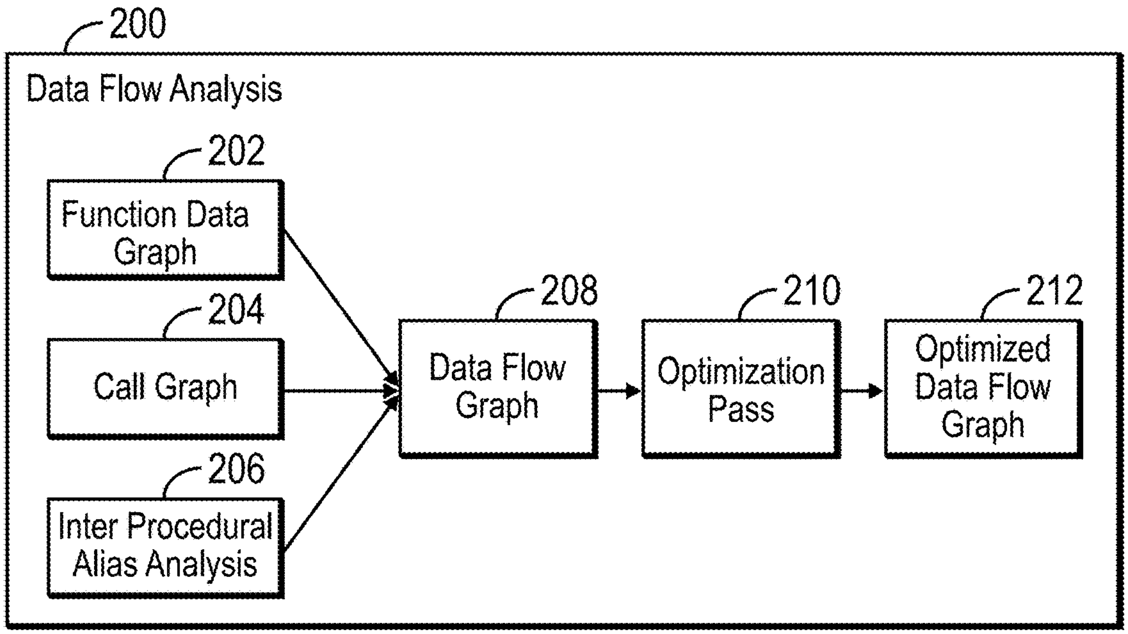
FIG. 2 illustrates an embodiment of a data flow analysis.

FIG. 2 illustrates an embodiment of components in the data flow analysis 200 to generate the data flow graph 108. The data flow analysis 200 generates a function data graph 202 that represents how each function in the program 102 generates output from input, i.e., transforms or modifies the argument value to result in the output. The data flow analysis 200 further generates a call graph 204 which represents calling relationships between system calls and functions in the program 102. Further, an inter-procedure alias analysis 206 determines how arguments are populated through one or more pointers. The data flow analysis 200 combines the output from the function data graph 202, call graph 204, and the inter-procedure alias analysis 206 to generate the data flow graph 208. An optimization pass 210 processes the data flow graph 208 to compress and coalesce redundant paths to produce an optimized data flow graph 212, which may comprise the flow graph 108.

Figure 3A:
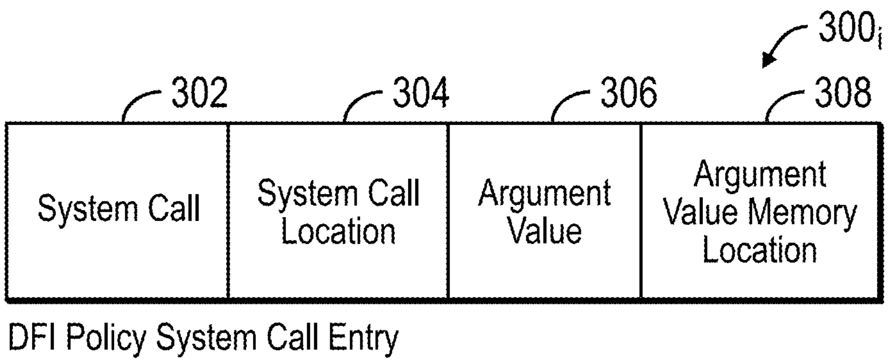
FIG. 3A illustrates an embodiment a data flow integrity (DFI) policy entry for a system call.

FIG. 3A illustrates an embodiment of an instance of a DFI policy system call entry 300; of the DFI policy 300 to instruct the reference monitor 118 how to process system calls in the binary 116, and includes a system call 302 identifying a system call; a system call location 304 indicating where in the binary 116 the system call 302 is invoked; an argument value 306 name passed to the system call 304; and an argument value memory location 308 where the argument value 306 is saved during binary 116 execution. The instrumentation may save the argument value 306 at the memory location 308.

Figure 3B:
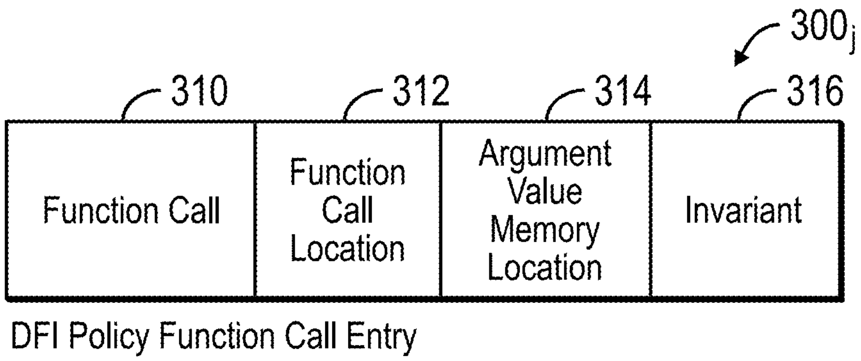
FIG. 3B illustrates an embodiment a data flow integrity (DFI) policy entry for a function call.

FIG. 3B illustrates an embodiment of an instance of a DFI policy function call entry 300*j* of the DFI policy 300 to instruct the reference monitor 118 how to process function calls, such as shared library calls, in the binary 116, and includes a function call 310 identifying a function call; a function call location 312 indicating where in the binary 116 the function call 310 is invoked; an argument value memory location 314 where an argument value from user input or a constant for the function 310 is saved when received; and an invariant 316 to invoke to check whether the function 310 changes the argument value as expected.

FIG. 4 illustrates an embodiment of operations performed by the compiler 104 and data flow analysis 200 to compile a program 102 into a binary 116 and add to the binary 116 instrumentations, i.e., instructions or special code invoked at interrupts, to save received input and calculated invariant output, and produce the data flow integrity policy (DFI) 300 used by the reference monitor 118 to maintain integrity of system and function calls to prevent malicious use of these calls. Upon receiving (at block 400) program 102 source code and environment information 106 for the program 102, the data flow analysis 200 analyzes the program 102 to generate (at block 402) a function data graph 202 indicating how functions in the program 102 modify input to generate output. The data flow analysis 200 further generates (at block 404) a call graph 204 indicating how functions and system calls call each other, points where argument values and dependent values, on which the system call argument value depends, are written to memory locations and performs (at block 406) inter-procedural alias analysis 206 to determine argument values populated through pointers. The data flow analysis 200 generates (at block 408) a data flow graph 208 from the function data graph 202, call graph 204, and inter-procedural alias analysis 206. The data flow analysis 200 determines (at block 410), from the data flow graph 204, points in the program at which data may be written to memory locations for argument values and dependent values. The compiler 104 generates (at block 412) instrumentation 110 in the form of sensitive data monitors 112 implemented in the binary 116 to save data received for argument values in the system calls from user input or constants. This instrumentation 110 may comprise instructions in the binary 116. The compiler 104 generates (at block 414) data flow integrity policy (DFI) system call entries 300; indicating, for each system call for sensitive data, a system call 302, system call location 304 in the binary 116, argument value 306 for the system call, and argument value memory location 308 to which the argument value is written.

The compiler 104 further generates (at block 416) invariants 114 from the data flow graph 108 from information on how function calls transform input data to output, where the invariants 114 determine whether the called functions change the argument values as expected. The compiler 104 generates (at block 418) instrumentation for function calls in the binary 116, in the form of the sensitive data monitors 112 embedded in the binary 116, to save received input data for function calls and to call invariants 114 for the function/shared library calls to determine whether the functions changed the argument values as expected. The compiler 104 generates (at block 420) data flow integrity policy (DFI) function call entries 300*j* indicating a function call 310, function call location 312 in binary 116, argument value memory location 314 where argument value saved, and invariant 316 for the function to check whether the function 310 changes the argument value as expected to produce the output. The DFI policy 300 is provided (at block 422) to the reference monitor 118 to use to check the integrity of system and function calls.

With the embodiment of FIG. 4 the compiler 104 generates instrumentation 110 to check whether argument values for system and function calls have changed since written to memory and generate invariants 114 to use to check whether functions process argument values as expected. The compiler 104 may embed this generated instrumentation into the binary 116 to have the binary save received input for system and function calls. This allows the user input and constants originally provided for argument values for system and function calls to be checked for data integrity and whether a malicious attack has changed argument values for system and function calls. Described embodiments improve processing by having reference monitor 118 check the integrity of system and function calls in the binary to reduce overhead on the binary 116 execution.

Figure 5:
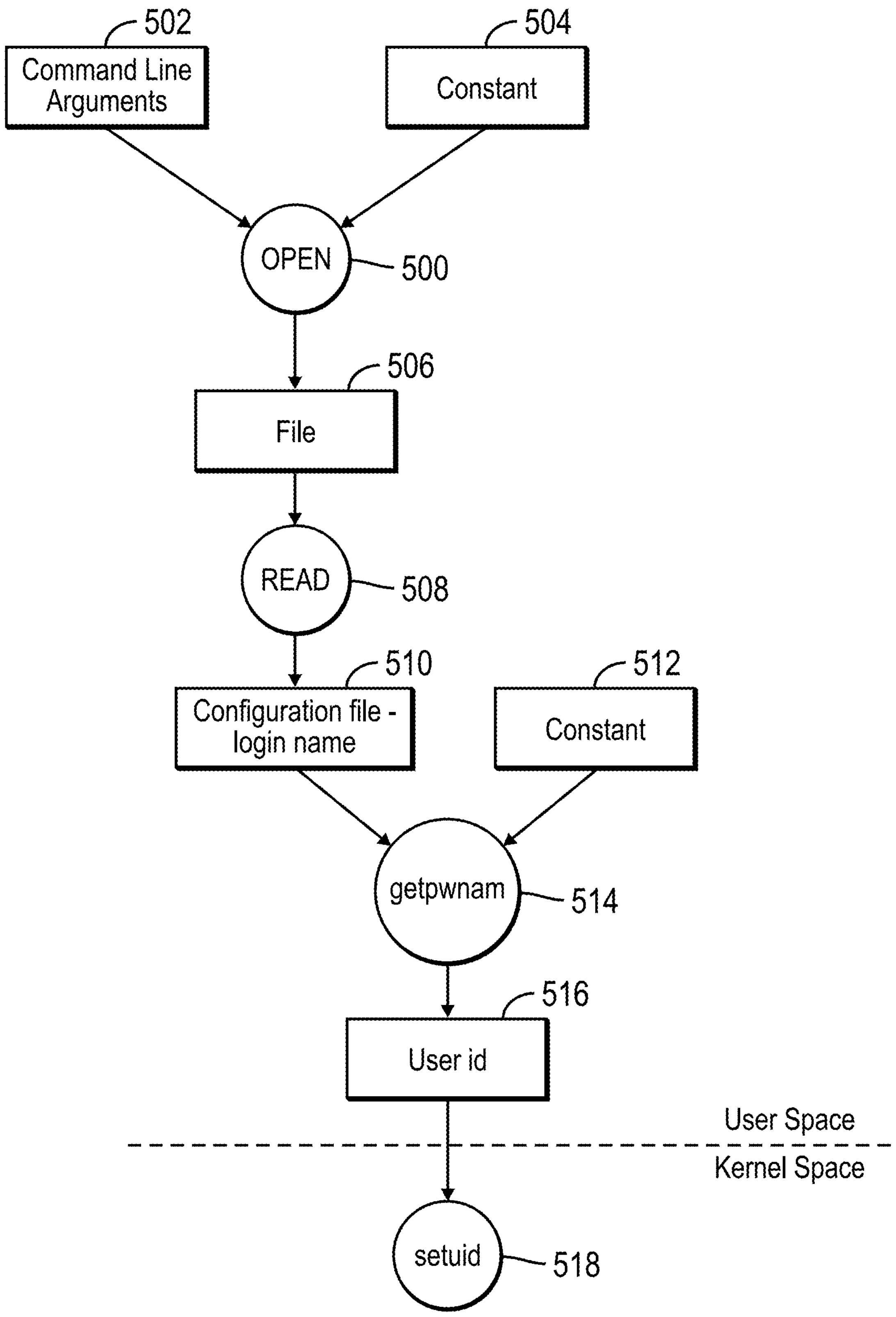
FIG. 5 illustrates an example of a program flow with points at which data is received for system calls and a function call.

FIG. 5 illustrates an example of a program flow and how instrumentation may be included in the binary 116 to save argument values and dependent values to use in integrity checking. A first system call 500, or "Open" call, receives an argument value of a file to open from command line arguments 502 or a constant 504. The initially received argument 502 or constant 504 may be compared with a presented argument value to check whether the argument value has changed. The opened file 506 may be read by the read 508 system call to produce a configuration file-login name 510 or constant 512, which comprises an argument value for the function 514 to get the password, "getpwnam". The argument value 510 or 512 to the function 514, when received, may be compared to the argument value passed to the function 514 to determine whether the argument value has changed. Further an invariant for the function 514 may be called to determine whether the function 514 operates on the argument value 510 or 512 as expected to produce the user id 516 output. If the invariant determines the argument value 510 or 512 is operated on as expected, then the user id 516 output may be provided to the system call 518 to set the user ID, "setuid". In the example of FIG. 5, the argument values to system calls/functions 500, 508, and 514 comprise dependent values used to produce the argument value 516 provided to the system call 518.

Figure 6:
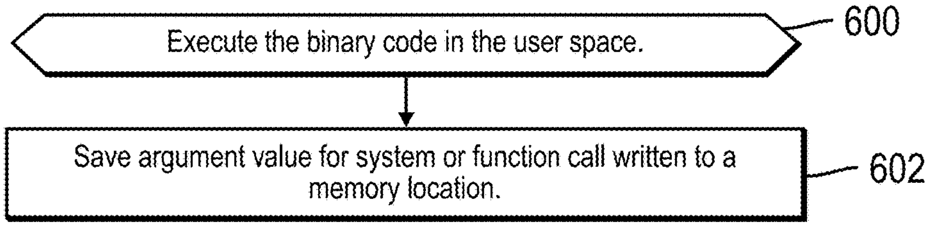
FIG. 6 illustrates an embodiment of operations executing the binary code with the instrumentation to save data received for function calls and system calls.

FIG. 6 illustrates an embodiment of operations performed by the instrumentation 110, such as sensitive data monitors 112, when executing the binary 116 in a user space 124, where the instrumentation may be embedded in the binary code 116. Upon executing (at block 600) the binary code 116, an argument value for a system or function call written to a memory location is saved (at block 602). Argument values for function values may comprise dependent values used by functions to generate an argument value for a system call, as shown in FIG. 5.

With the embodiment of FIG. 6, the instrumentation for the binary 116 performs operations to save argument values for functions and system calls to later use to check the data integrity of an argument value passed to the system or function call.

Figure 7:
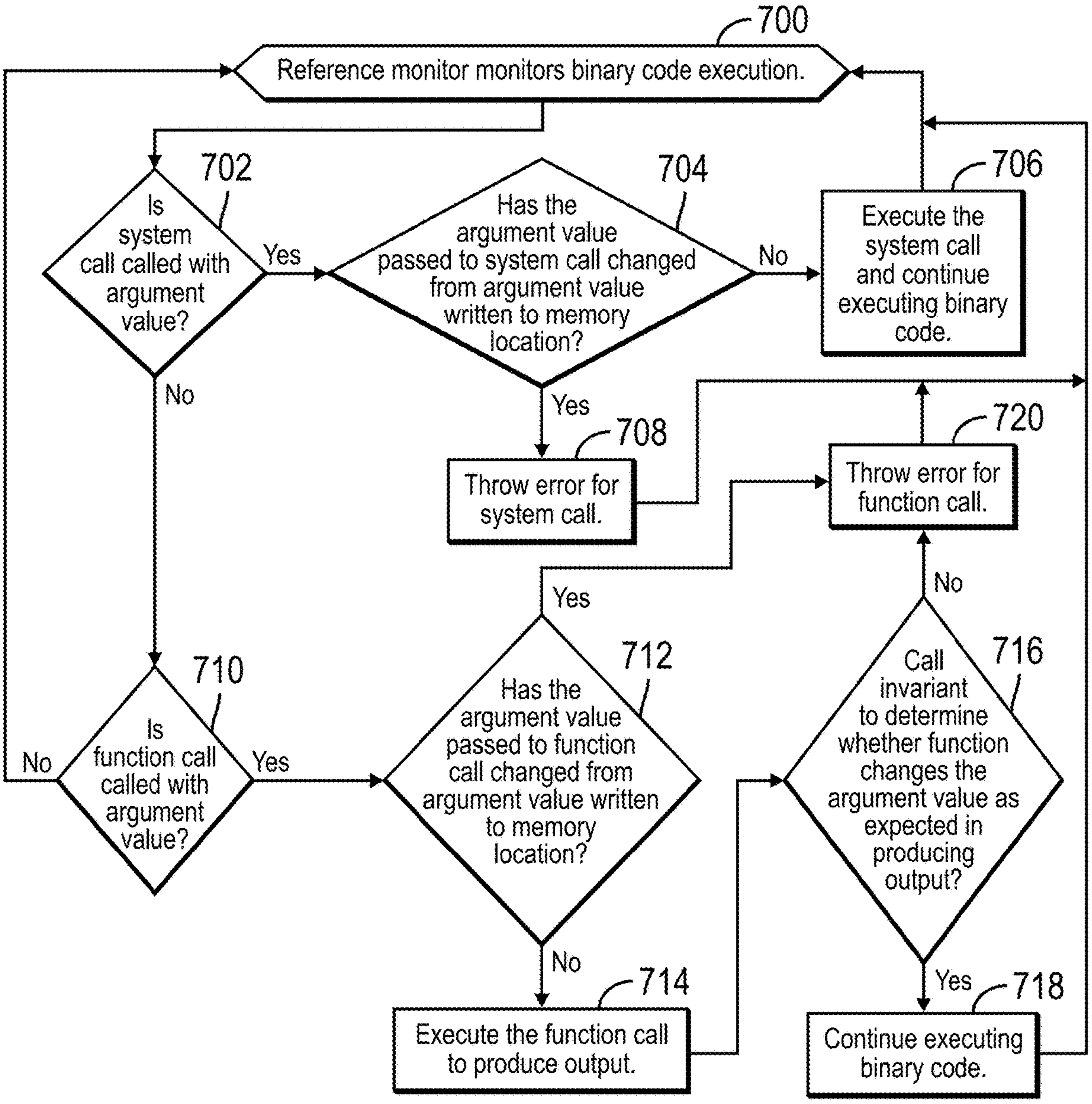
FIG. 7 illustrates an embodiment of operations performed by a reference monitor to perform data integrity checking of system and function calls in executed binary code.

FIG. 7 illustrates an embodiment of operations performed by the reference monitor 118 operating in the kernel space 120 to monitor execution of binary code 116 for integrity checking. Upon the reference monitor 118 executing (at block 700), if (at block 702) a system call is called with an argument value, the reference monitor 118 determines (at block 704) whether the argument value passed to the system call 302 changed from the argument value written to the memory location 308 when received. If (at block 704) there is no change to the argument value, then the system call is executed (at block 706) and execution of the binary 116 continues. If (at block 704) the argument value has changed since initially received, indicating the argument value may have been maliciously altered, then a system error is thrown (at block 708) to address the change to the argument value.

If (at block 702) the call is not a system call, but a function call (at block 710), then the reference monitor 118 determines (at block 712) whether the argument value passed to a function call changed from the argument value written to a memory location when received. If (at block 712) the argument value has not changed, then the function call is executed (at block 714) to produce output. After executing the function, the invariant 316 for the function may be called (at block 716) to determine whether the function call 310 changes the argument value as expected in producing the output. If (at block 716) the invariant 316 determines the argument value is processed as expected, then the execution of the binary code 116 continues (at block 718). If (at block 716) the invariant 316 determines the argument value is not processed as expected to produce the output, then an error is thrown (at block 720) for the function all. The argument values to the function calls may comprise dependent values used to calculate an argument value for a subsequent system call.

With the embodiment of FIG. 7, the reference monitor 118 monitors argument values passed to function and system calls to check the integrity of system and function calls by checking whether the argument values have changed since received. This integrity checking blocks malicious operations to exploit memory locations to change the argument values to pass to the system and function calls to perform malicious operations.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With respect to FIG. 8, computing environment 800 contains an example of an environment for the execution of at least some of the computer code involved in performing the inventive methods in block 845, including the compiler 104 and data flow analysis 200 of FIG. 1 to compile a program 102 to generate instrumentation 110 and binary code 116. In addition to block 845, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 845, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer-readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 845 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid-state storage devices. Operating system 822 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer-readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on. The EUD 803 may execute the binary code 116 and the reference monitor 118 to check the integrity of the binary code 116 produced by the compiler 104.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

CLOUD COMPUTING SERVICES AND/OR MICROSERVICES (not separately shown in FIG. 8): private and public clouds 806 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i and j, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for implementing data flow integrity in a computer program, the computer program product comprising a computer readable storage medium having computer readable program code embodied therein that is executable to perform operations, the operations comprising:

generating instrumentation to determine whether argument values passed to function calls and system calls have changed since written to a memory during execution of the computer program;

providing a reference monitor that runs during execution of the computer program to perform:

comparing a first argument value of the argument values, for a function call, written to the memory, to a second argument value of the argument values passed to the function call, after the first argument value is received, to determine whether the second argument value has changed from the first argument value;

permitting execution of the function call with the second argument value in response to determining that the second argument value has not changed from the first argument value;

comparing a third argument value of the argument values, for a system call, written to the memory, to a fourth argument value of the argument values passed to the system call, after the third argument value is received, to determine whether the fourth argument value has changed from the third argument value; and permitting execution of the system call with the fourth argument value in response to determining that the fourth argument value has not changed from the third argument value.

2. The computer program product of claim 1, wherein the reference monitor further performs during the execution of the computer program:

blocking the execution of the function call in response to determining that the second argument value has changed from the first argument value.

3. The computer program product of claim 1, wherein the computer program is executed in a user space, and wherein the reference monitor executes in a kernel space.

4. The computer program product of claim 1, wherein the operations further comprise:

generating invariants to model how operations of functions, comprising the function calls and the system calls, modify the argument values passed to the functions to generate outputs without executing the functions;

using the invariants, during the execution of the computer program, to determine whether the functions have processed the argument values passed to the functions as expected without executing the functions; and generating an error in response to determining that an invariant of the invariants determines that one of the functions has not changed an argument value of the argument values as expected to generate the outputs.

5. The computer program product of claim 1, wherein the reference monitor further performs, during the execution of the computer program:

in response to determining that the second argument value passed to the function call has not changed from the first argument value, calling an invariant of the invariants for the function call to determine whether the function call has modified the second argument value as expected to generate outputs; and continuing executing the computer program using the outputs from the function call in response to the invariant determining that the function call modified the second argument value as expected.

6. The computer program product of claim 1, wherein the operations further comprise:

generating a data integrity policy indicating, for a function call, an argument value of the argument values for the function call, a memory location in the memory where the argument value for the function call is written, and an invariant of the invariants for the function call to determine whether the function call modifies the argument value as expected without executing the function call; and processing the data integrity policy to determine whether the argument value passed to the function call has changed from the argument value written to the memory location for the function call and to call the invariant for the function call to determine whether the argument value passed to the function call was modified as expected to generate output of the function call.

7. The computer program product of claim 1, wherein the operations further comprise:

generating a function data graph analyzing functions, comprising the function calls and the system calls, to determine how the functions modify inputs to generate outputs;

generating a call graph indicating how the functions call each other in source code of the computer program;

performing inter-procedural alias analysis to determine a set of argument values of the argument values populated through pointers;

generating a data flow graph from the function data graph, the call graph, and the inter-procedural alias analysis; and optimizing the data flow graph to compress and coalesce redundancies in the data flow graph to simplify data flow, wherein the data flow graph is processed to determine points in the computer program at which data is received for the argument values in the functions.

8. The computer program product of claim 1, wherein the operations further comprise:

generating a data integrity policy indicating for the system call, the third argument value for the system call, a memory location in the memory where the third argument value received for the system call is written; and processing, by the reference monitor, the data integrity policy to determine whether the fourth argument value passed to the system call has changed since the third argument value for the system call was written to the memory location.

9. A system for implementing data flow integrity in a computer program, the system comprising:

a processor; and a computer readable storage medium having computer readable program code embodied therein that when executed by the processor performs operations, the operations comprising:

generating instrumentation to determine whether argument values passed to function calls and system calls have changed since written to memory during execution of the computer program;

providing a reference monitor that runs during execution of the computer program to perform:

comparing a first argument value of the argument values, for a function call, written to the memory, to a second argument value of the argument values passed to the function call, after the first argument value is received, to determine whether the second argument value has changed from the first argument value;

permitting execution of the function call with the second argument value in response to determining that the second argument value has not changed from the first argument value;

comparing a third argument value of the argument values, for a system call, written to the memory, to a fourth argument value of the argument values passed to the system call, after the third argument value is received, to determine whether the fourth argument value has changed from the third argument value; and permitting execution of the system call with the fourth argument value in response to determining that the fourth argument value has not changed from the third argument value.

10. The system of claim 9, the reference monitor further performs during the execution of the computer program:

blocking the execution of the function call in response to determining that the second argument value has changed from the first argument value.

11. The system of claim 9, wherein the operations further comprise:

generating invariants to model how operations of functions, comprising the function calls and the system calls, modify the argument values passed to the functions to generate outputs without executing the functions;

using the invariants, during the execution of the computer program, to determine whether the functions have processed the argument values passed to the functions as expected without executing the functions; and generating an error in response to determining that an invariant of the invariants determines that one of the functions has not changed an argument value of the argument values as expected to generate the outputs.

12. The system of claim 9, wherein the reference monitor further performs, during the execution of the computer program:

in response to determining that the second argument value passed to the function call has not changed from the first argument value, calling an invariant of the invariants for the function call to determine whether the function call has modified the second argument value as expected to produce an output; and continuing executing the computer program using the output from the function call in response to the invariant determining that the function call modified the second argument value as expected.

13. The system of claim 9, wherein the operations further comprise:

generating a function data graph analyzing functions, comprising the function calls and the system calls, to determine how the functions modify inputs to generate outputs;

generating a call graph indicating how the functions call each other in source code of the computer program;

performing inter-procedural alias analysis to determine a set of argument values of the argument values populated through pointers;

generating a data flow graph from the function data graph, the call graph, and the inter-procedural alias analysis; and optimizing the data flow graph to compress and coalesce redundancies in the data flow graph to simplify data flow, wherein the data flow graph is processed to determine points in the computer program at which data is received for argument values in the functions.

14. The system of claim 9, wherein the operations further comprise:

generating a data integrity policy indicating for the system call, the third argument value for the system call, a memory location in the memory where the third argument value received for the system call is written; and processing, by the reference monitor, the data integrity policy to determine whether the fourth argument value passed to the system call has changed since the third argument value for the system call was written to the memory location.

15. A method for implementing data flow integrity in a computer program, the method comprising:

generating instrumentation to determine whether argument values passed to function calls and system calls have changed since written to a memory during execution of the computer program;

providing a reference monitor that runs during execution of the computer program to perform:

comparing a first argument value of the argument values, for a function call, written to the memory, to a second argument value of the argument values passed to the function call, after the first argument value is received, to determine whether the second argument value has changed from the first argument value; and permitting the execution of the function call with the second argument value in response to determining that the second argument value has not changed from the first argument value;

comparing a third argument value of the argument values, for a system call, written to the memory, to a fourth argument value of the argument values passed to the system call, after the third argument value is received, to determine whether the fourth argument value has changed from the third argument value; and permitting the execution of the system call with the fourth argument value in response to determining that the fourth argument value has not changed from the third argument value.

16. The method of claim 15, wherein the reference monitor further performs during the execution of the computer program:

blocking the execution of the function call in response to determining that the second argument value has changed from the first argument value.

17. The method of claim 15, further comprising:

generating invariants to model how operations of functions, comprising the function calls and the system calls, modify the argument values passed to the functions to generate outputs without executing the functions;

using the invariants, during execution of the computer program, to determine whether the functions have processed the argument values passed to the functions as expected without executing the functions; and generating an error in response to determining that an invariant of the invariants determines that one of the functions has not changed an argument value of the argument values as expected to generate the outputs.

18. The method of claim 15, wherein the reference monitor further performs, during the execution of the computer program:

in response to determining that the second argument value passed to the function call has not changed from the first argument value, calling an invariant of the invariants for the function call to determine whether the function call has modified the second argument value as expected to produce an output; and continuing executing the computer program using the output from the function call in response to the invariant determining that the function call modified the second argument value as expected.

19. The method of claim 15, further comprising:

generating a function data graph analyzing functions, comprising the function calls and the system calls, to determine how the functions modify inputs to generate outputs;

generating a call graph indicating how the functions call each other in source code of the computer program;

performing inter-procedural alias analysis to determine a set of argument values of the argument values populated through pointers;

generating a data flow graph from the function data graph, the call graph, and the inter-procedural alias analysis; and optimizing the data flow graph to compress and coalesce redundancies in the data flow graph to simplify data flow, wherein the data flow graph is processed to determine points in the computer program at which data is received for the argument values in the functions.

* * * * *